United States Patent
Dreher

(10) Patent No.: US 9,647,498 B2
(45) Date of Patent: May 9, 2017

(54) ELECTRIC MACHINE

(71) Applicant: SEW-EURODRIVE GMBH & CO. KG, Bruchsal (DE)

(72) Inventor: Florian Dreher, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 482 days.

(21) Appl. No.: 14/374,105

(22) PCT Filed: Jan. 21, 2013

(86) PCT No.: PCT/EP2013/000172
§ 371 (c)(1),
(2) Date: Jul. 23, 2014

(87) PCT Pub. No.: WO2013/110451
PCT Pub. Date: Aug. 1, 2013

(65) Prior Publication Data
US 2014/0346920 A1 Nov. 27, 2014

(30) Foreign Application Priority Data
Jan. 23, 2012 (DE) .................. 10 2012 001 118

(51) Int. Cl.
*H02K 1/22* (2006.01)
*H02K 1/14* (2006.01)
(Continued)

(52) U.S. Cl.
CPC .............. *H02K 1/14* (2013.01); *H02K 1/145* (2013.01); *H02K 3/32* (2013.01); *H02K 5/04* (2013.01);
(Continued)

(58) Field of Classification Search
CPC ........ H02K 1/148; H02K 3/522; H02K 1/146; H02K 21/16; H02K 1/145; Y10T 29/49009; Y10T 29/49078
(Continued)

(56) References Cited

U.S. PATENT DOCUMENTS 6,946,771 B2   9/2005   Cros et al.
6,965,179 B2   11/2005  Willmer et al.
(Continued)

FOREIGN PATENT DOCUMENTS

DE   10 2005 020 952   11/2006
DE   10 2007 017 050   10/2007
(Continued)

OTHER PUBLICATIONS

International Search Report, dated Jul. 4, 2014, issued in corresponding International Application No. PCT/EP2013/000172.
(Continued)

*Primary Examiner* — Thanh Lam
(74) *Attorney, Agent, or Firm* — Andrews Kurth Kenyon LLP

(57) ABSTRACT

An electric machine, especially a transversal flux machine, the stator being composed of a stack of phase segments, each phase segment having at least one stator segment and one stator winding, especially a single winding, each stator segment having an annular stator bridge, on which pole shoes are premolded, which in particular extend in the radially inward direction, and/or which extend in the direction of the rotor and/or which are situated between the rotor and the annular stator bridge, the pole shoes having the same shape, in particular, the axial width of the pole shoe decreasing with increasing radial clearance, the associated profile being disposed between a first and a second profile, the first profile being a linear function of the radial clearance, the
(Continued)

pole back associated with the first profile being a planar area, in particular, the second profile being a circular function, in particular a circular segment function, the pole back associated with the second profile being a cylindrical section area, in particular.

28 Claims, 9 Drawing Sheets

(51) Int. Cl.
 *H02K 15/02* (2006.01)
 *H02K 3/32* (2006.01)
 *H02K 5/04* (2006.01)
 *H02K 3/52* (2006.01)

(52) U.S. Cl.
 CPC .......... *H02K 15/022* (2013.01); *H02K 3/525* (2013.01); *Y10T 29/49009* (2015.01)

(58) Field of Classification Search
 USPC .......... 310/216.001–216.137, 89, 43; 29/596
 See application file for complete search history.

(56) References Cited

U.S. PATENT DOCUMENTS

| 7,649,298 | B2 | | 1/2010 | Enomoto et al. | |
|---|---|---|---|---|---|
| 8,056,211 | B2 | * | 11/2011 | Holmes | H02K 1/145 |
| | | | | | 29/592.1 |
| 8,258,670 | B2 | * | 9/2012 | Sakuma | H02K 1/185 |
| | | | | | 310/216.118 |
| 2002/0070627 | A1 | * | 6/2002 | Ward | H02K 1/145 |
| | | | | | 310/254.1 |
| 2006/0170295 | A1 | * | 8/2006 | Allen | H02K 15/0006 |
| | | | | | 310/89 |
| 2007/0090720 | A1 | | 4/2007 | Aoki et al. | |
| 2007/0145854 | A1 | | 6/2007 | Enomoto et al. | |
| 2009/0212649 | A1 | * | 8/2009 | Kingman | H02K 1/185 |
| | | | | | 310/91 |
| 2010/0109471 | A1 | * | 5/2010 | Tellier | H02K 1/148 |
| | | | | | 310/216.074 |
| 2011/0309711 | A1 | * | 12/2011 | Brown | H02K 1/148 |
| | | | | | 310/216.007 |
| 2012/0013209 | A1 | | 1/2012 | Ramon et al. | |

FOREIGN PATENT DOCUMENTS

| EP | 1 420 503 | 5/2004 |
|---|---|---|
| EP | 2 006 977 | 12/2008 |
| EP | 2 006 978 | 12/2008 |
| EP | 2 573 918 | 3/2013 |

OTHER PUBLICATIONS

International Preliminary Report on Patentability, dated Sep. 22, 2014, issued in corresponding International Application No. PCT/EP2013/000172.

* cited by examiner

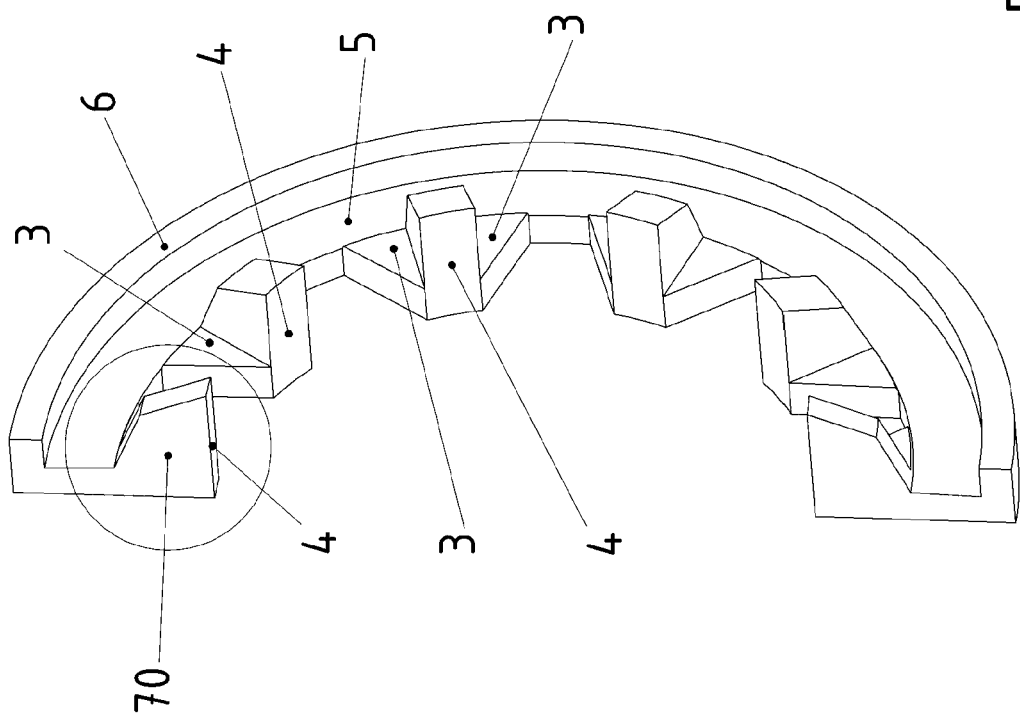

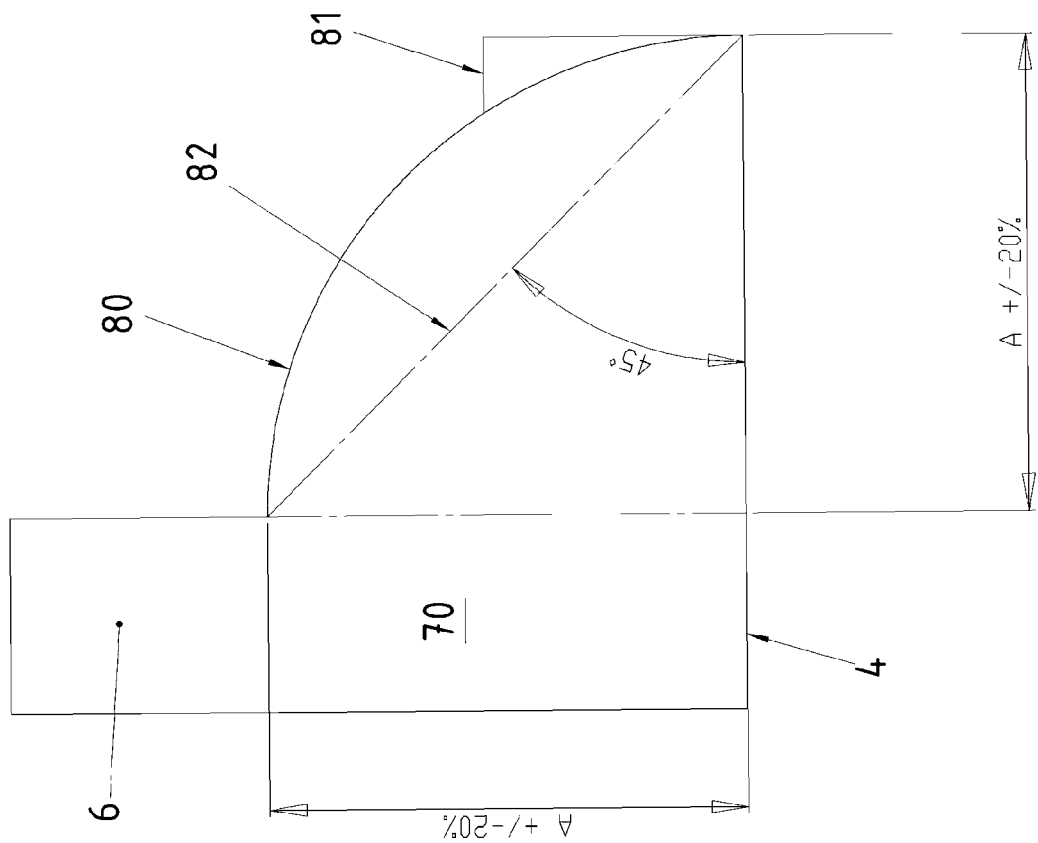

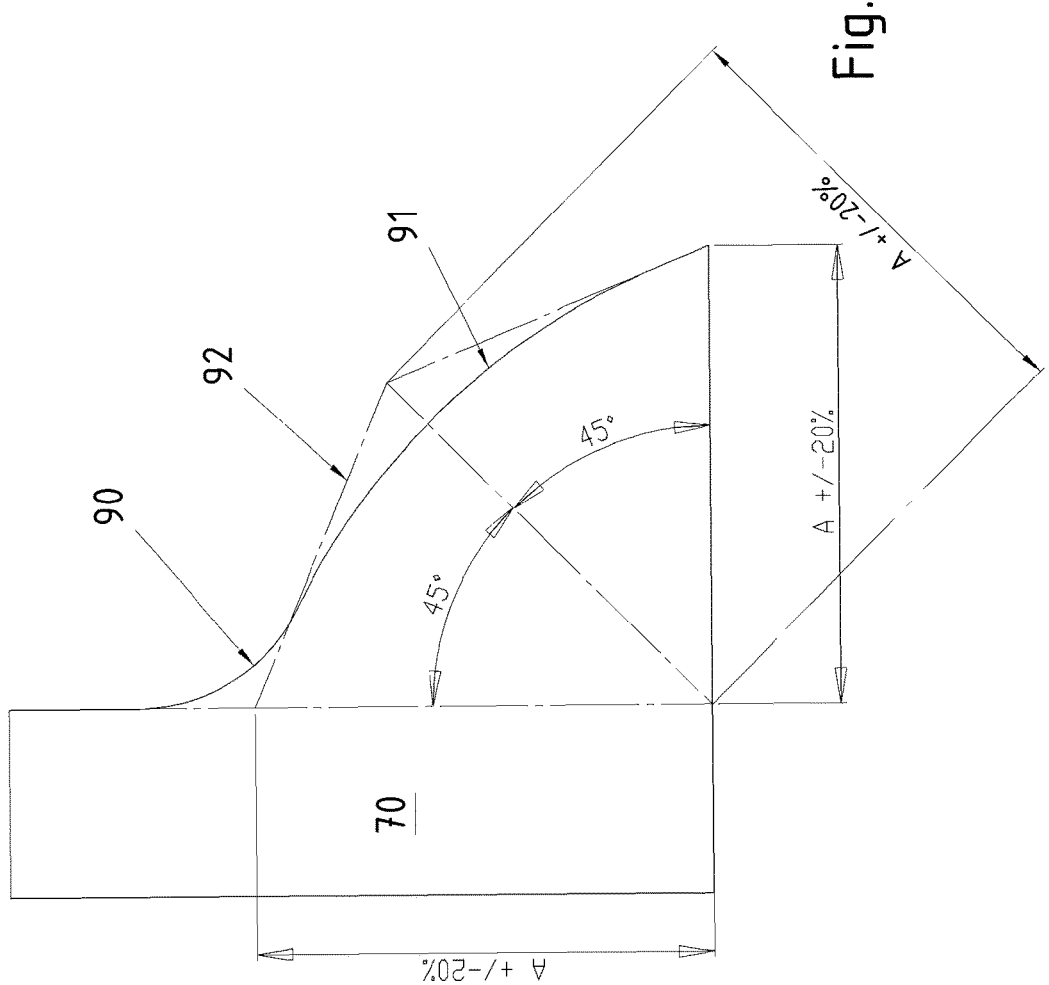

ELECTRIC MACHINE

FIELD OF THE INVENTION

The present invention relates to an electric machine.

BACKGROUND INFORMATION

It is common knowledge that electric machines have a stator and a rotor, which is rotationally mounted in relation thereto and includes an active component. The stator produces one or more alternating field(s), which superpose to form a rotating field. A torque is produced in a reciprocal action with an excitation field of the rotor.

SUMMARY

Therefore, the present invention is based on the objective of further developing an electric machine in a compact manner, the production of which can be carried out in an uncomplicated manner.

Important features of the invention in terms of the electric machine, especially a transversal flux machine, are that the stator is composed of a stack of phase segments, each phase segment has at least one stator segment and one stator winding, especially a single winding, each stator segment has an annular stator bridge, on which pole shoes are premolded, which extend at a right angle to the bridge, in particular, i.e., in the radially inward direction, and/or which extend in the direction of the rotor and/or which are situated between the rotor and the annular stator bridge, the pole shoes have the same shape, in particular, the stack is accommodated in a housing component, the housing component in particular has an axially extending cable channel, especially an axially extending depression on its surface facing the stack, especially the inner surface, the housing component in particular is connected to the stack in a force-locking manner, the housing component is thermally shrink-fitted on or bonded to the stack, in particular. By accommodating the stack in the housing component, it is advantageously possible to create a permanent connection in a simple manner. The outgoing and incoming lines of the phase segments of the stack can be routed radially to the outside and are guided inside the axially extending channel, which is formed and/or created as a depression in the receiving bore of the housing component. The electrical connection lines of the stator windings of the phase segments are therefore easy connect or to be routed to the outside. The particular part that holds the phase segments together as stacks and therefore also secures the twisting of the phase segments relative to each other is employed for the protected outward routing and/or for the connection of the connection lines.

It is furthermore advantageous that no magnetic rotating field is provided in the present invention.

In one advantageous development, each stator segment has two radially extending depressions, especially slots, which are set apart from each other by one half of the pole shoe clearance in the circumferential direction. This has the advantage that two substantially identical stator segments are able to be stacked directly on top of each other in the axial direction, so that a compact construction providing high power density is achievable. It is also advantageous that the depressions are able to be produced by notching or other shaping methods. This allows for a cost-effective production. Because of the clearance according to the present invention, the slots of the two stator segments are able to be made congruent despite the twisting of two stator segments. For this purpose, the two stator segments are rotated relative to each other, at an angle that corresponds to one half of the pole shoe clearance, so that a pole shoe of a first stator segment is situated between two pole shoes of the other stator segment of the same phase segment in the circumferential direction.

In one advantageous development, the depressions are located on the side that faces the respective other stator segment of the same phase segment, especially the front end of the stator segment. This is advantageous inasmuch as the stator segments are able to be realized in the same way and the manufacturers warehouse therefore has to stock only one kind of stator segment. A mix-up during the installation is thus avoidable.

In one advantageous development, when joining the two stator segments to form the individual phase segment, the slots are able to be brought into congruence to form a passage for the incoming and/or outgoing line of the individual stator winding. It is advantageous that by setting the two depressions apart by half the pole shoe distance, the depressions are able to be brought into a congruent state. This makes it easy to align the two stator segments.

The depression is very narrow in the circumferential direction, so that a line-type development, i.e., a virtually one-dimensional development, is provided.

One of the depressions is preferably situated in the circumferential direction such that it is centered in relation to one of the pole shoes, that is to say, especially within the plane of symmetry of the pole shoe, i.e., symmetrically between two pole shoes. The slot above the pole shoe center of the individual stator segment enables the symmetrical configuration of the stator segments, however.

In one advantageous development, the pole shoe, especially each pole shoe, has a width in the circumferential direction that increases with increasing radial clearance;

in particular, the width in the circumferential direction increases with increasing radial clearance, especially in inverse proportion, essentially to the extent that the axial width decreases.

This has the advantage that the broadened areas on the sides represent lateral flux deflections and thereby make it possible to avoid saturation in the pole shoe. This improves the regulation characteristics, and a high torque is achievable at the most compact design possible. An additional advantage is also an improvement in the mechanical stability of the stator segment, and thus of the phase segment as well, which also reduces the noise generation and the oscillation tendency.

Another advantage is that the winding space for the stator winding is not restricted, so that a high copper volume is able to be realized using a compact design. In addition, a high number of windings makes it possible to achieve a corresponding voltage level. The field lines run through the broadened lateral region, which prevents a constriction on their way from the air-gap-side surface of the pole shoe to the stator bridge and, given an appropriate field strength, no saturation is induced in this constricted region.

The design featuring the laterally broadened shape in the radially outward direction widens the pole shoe, and thus also the penetration area that is available to the flux lines at each radial clearance, so that saturation is avoided.

The present invention therefore offers a compact solution, that is to say, high drive power per overall size of the electric machine.

The deflection of the field lines is from the air-gap-side of the pole shoe, which is broader in the axial direction than in the circumferential direction, in the direction of the stator bridge, the transition area from the pole shoe into the annular stator bridge in the circumferential direction being larger than in the axial direction.

In this way the pole shoe form according to the present invention, i.e., especially the lateral broadening in the radially outward direction, makes it possible to improve the regulation characteristics and allows a higher torque to be achieved at the most compact design possible.

In one advantageous development, the pole shoe of the first stator segment has a planar design on its side facing away from the other stator segment of the phase segment, in particular in order to allow the a very tight and contacting design of the stack of phase segments. This has the advantage that the phase segments are able to be stacked tightly next to each other, so that a compact design is able to be achieved.

In one advantageous development, the associated profile of the axial width as a function of the radial clearance is made up of two segments that are not parallel with each other, each being a linear function of the radial clearance; in other words, the pole back is composed of two planar surface pieces, in particular, which are non-parallel relative each other, which advantageously makes for an uncomplicated production.

In one alternative advantageous development, the associated profile of the axial width as a function of the radial clearance is made up of one bulbous and/or convex section and one concave section, the concave section having an arc length that is at least five times shorter than the other section. This advantageously reduces the risk of edge fractures and requires no piercings or the like. Appropriate machining tools can be used to produce the radii.

In one advantageous development, the air-gap-side surface of the pole shoe has an area value of essentially the same magnitude, or an area value that differs by maximally 20% in comparison with the transition area toward the stator bridge. In this context it is advantageous that the field lines are not subjected to a constriction and thus no saturation occurs.

In one advantageous development, the pole shoe has a pole back,
the pole back in particular at least partially facing in the direction of the stator winding and/or at least partially in the direction of the other stator segment,
the pole back connecting the air-gap-side area of the pole shoe facing the rotor with the stator bridge, especially the stator bridge surface,
the pole back having a bulbous shape and being composed of two non-parallel planar surface pieces. This advantageously reduces the risk of edge fractures. An additional advantage is an improvement in the mechanical stability of the stator segment, and thus of the phase segment as well, which also reduces the noise generation and the oscillation tendency.

In one advantageous development, the pole shoe is formed in such a way that essentially no subregion of the pole shoe goes into saturation as long as the surface area of the side surface of the pole shoe on the side of the air gap, i.e., especially the side facing the rotor, does not go into saturation yet. This has the advantage that the field lines are not constricted and the efficiency of the electric machine is therefore as high as possible.

In one advantageous development, the pole shoe has a width in the circumferential direction that increases with increasing radial clearance,
it being the case, in particular, that the width in the circumferential direction increases with increasing radial clearance, in particular in inverse proportion, essentially to the extent that the axial width decreases. This has the advantage that the field lines are able to be deflected from the air-gap-side pole shoe surface, which is broad in the axial direction, into the transition area of the pole shoe facing the stator, which is broad in the circumferential direction, without the field lines having to pass through a constriction, without the winding space for the stator winding being reduced, and without the air gap between the stator segments of a same phase segment being reduced. An additional advantage is also an increase in the mechanical stability of the stator segment, and thus of the phase segment as well, which also reduces the noise generation and the oscillation tendency.

In one advantageous development, the axial width of the pole shoe decreases with increasing radial clearance,
the associated profile is disposed between a first and a second profile,
the first profile is a linear function of the radial clearance, the pole back associated with the first profile being a planar area, in particular,
the second profile is a circular function, in particular a circular segment function, the pole back associated with the second profile being a cylindrical section area, in particular. This has the advantage that, although the first profile would be easy to produce, there is the inherent risk that an at least partial saturation of the pole shoe is reached at field intensity values that do not yet lead to saturation of the air-gap-side surface of the pole shoe, because the linear transition is not bulbous or convex. The field lines must therefore pass through a constriction on their way from the air-gap-side surface of the pole shoe to the stator bridge, and given a corresponding field strength, then cause saturation in this constricted region.

Because of the bulbous shape, the narrowing is widened, and saturation is therefore avoided.

However, the bulbous shape is advantageously less bulbous than the second profile, because if the bulbous form of the second profile is exceeded, the winding space available for the stator winding becomes smaller and the output of the electric machine is reduced, which means that no compact design is possible.

For the present invention offers a compact solution in this manner, that is to say, high drive power in relation to the overall size of the electric machine.

That is to say, the pole shoe should be bulbous, but the bellied profile should stay below the boundary profile described by the second profile.

The deflection of the field lines is from the side of the pole shoe on the air gap side, which is broader in the axial direction than in the circumferential direction, in the direction of the stator bridge, the transition area from the pole shoe into the annular stator bridge being larger in the circumferential direction than in the axial direction.

The described pole shoe form, especially the form profile of the pole shoe back, enables an essentially constant flux density on the pole shoe surface on the side of the air gap. This improves the regulation characteristics, and a high torque is achievable at the most compact design possible.

An additional advantage is also an improvement in the mechanical stability of the stator segment, and thus of the phase segment as well, which also reduces the noise generation and oscillation tendency.

In one advantageous development, the pole shoe is formed symmetrically with respect to a plane of symmetry, the plane of symmetry running through the center of mass of the pole shoe and being defined by the radial direction starting at the center of mass, and the axial direction. In one alternative advantageous development, the pole shoe is formed in symmetry with a plane of symmetry, the plane of symmetry running through the center of mass of the pole shoe, and the direction of the surface normal being the tangential direction at the center of mass. This has the advantage that the stator segments of a phase segment are able to be realized in an identical manner and thus only one part instead of two needs to be stocked by the warehouse.

In one advantageous development, an edge of the pole shoe has a broader shape. This has the advantage that the risk of an edge fracture is able to be reduced. Another advantage is also an improvement in the mechanical stability of the stator segment, and thus of the phase segment as well, which also reduces the noise generation and the oscillation tendency.

In one advantageous development, the area value of the surface of intersection of the pole shoe with a first area, is essentially equal to the area value of the air-gap-side side surface, i.e., the side surface facing the rotor, of the pole shoe, or at least deviates by less than 10% or 20%, the first surface being a tangential plane, which has the respective radial clearance in relation to the rotor shaft axis, and/or which is aligned parallel to the rotor shaft axis, and/or which has the radial clearance and/or which is aligned perpendicular to the axis of symmetry, and/or whose direction of the normal connects the rotor shaft axis to the center of mass of the pole shoe, or the first area being a cylinder sleeve area, which has the respective radial clearance to the rotor shaft axis and/or which is aligned parallel with the rotor shaft axis.

This has the advantage that the material is able to be used to the most optimal degree possible, saturation is suppressed, and the winding space is available to the full extent.

In one advantageous development, the stator segment is made from pressed or sintered iron powder, in particular SMC, in one piece or multiple pieces. This advantageously allows an uncomplicated production.

Important features of the method for producing an electric machine are that during the production of the stack, a production machine detects and/or utilizes the slots to align, especially adjust, the relative angle of rotation of the phase segments with respect to one another. This advantageously allows an uncomplicated production of the stator with differently energized stator windings of the phase segments.

BRIEF DESCRIPTION OF THE DRAWINGS

FIG. 7 shows a sectioned stator segment 1, in which a pole shoe has a cut surface 70.

FIG. 8 shows cut surface 70 of the pole shoe from FIG. 7, but instead of the simplified surface profile of the pole shoe back composed of linear pieces, other profiles (80, 81, 82) are shown.

FIG. 9 shows a further profile 90, in which the edges are rounded.

DETAILED DESCRIPTION

Figure 1:
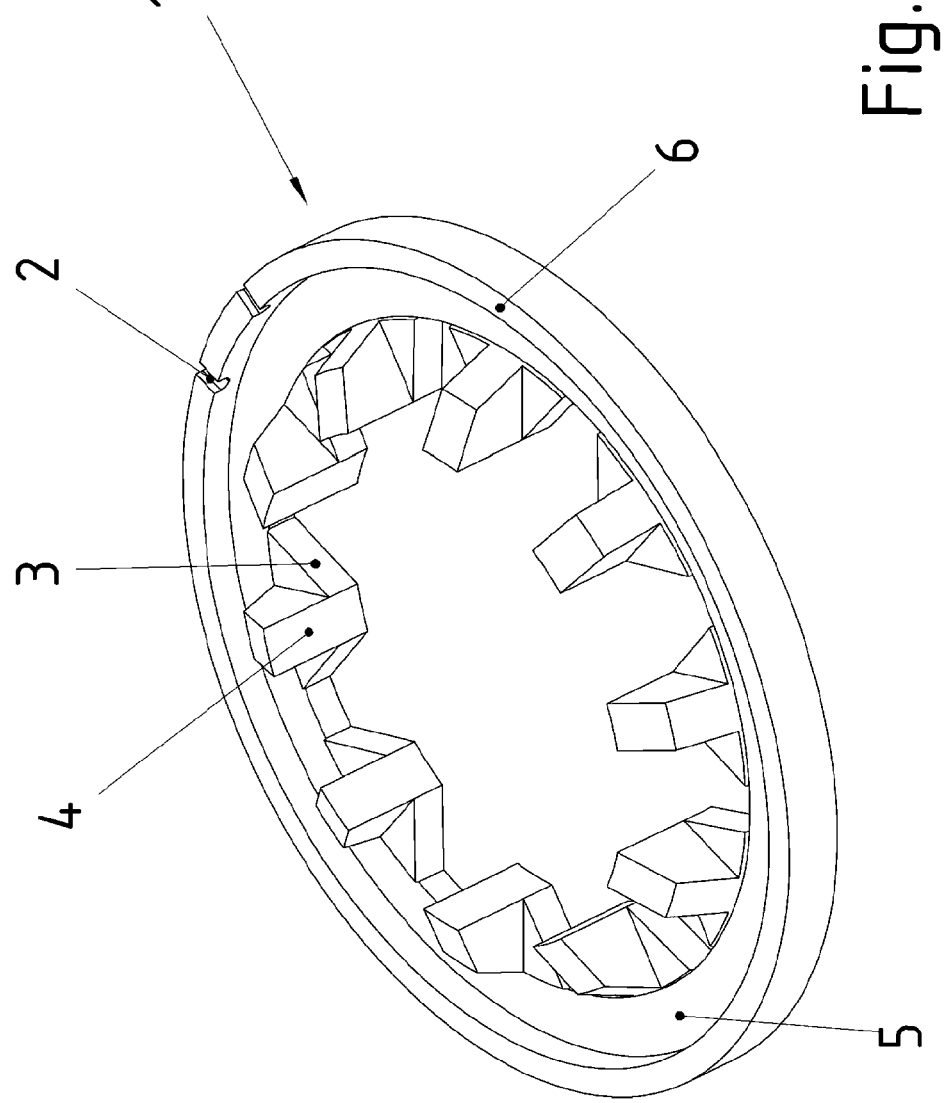
FIG. 1 shows an oblique view of a stator segment 1 of an electric motor according to the present invention.
Figure 2:
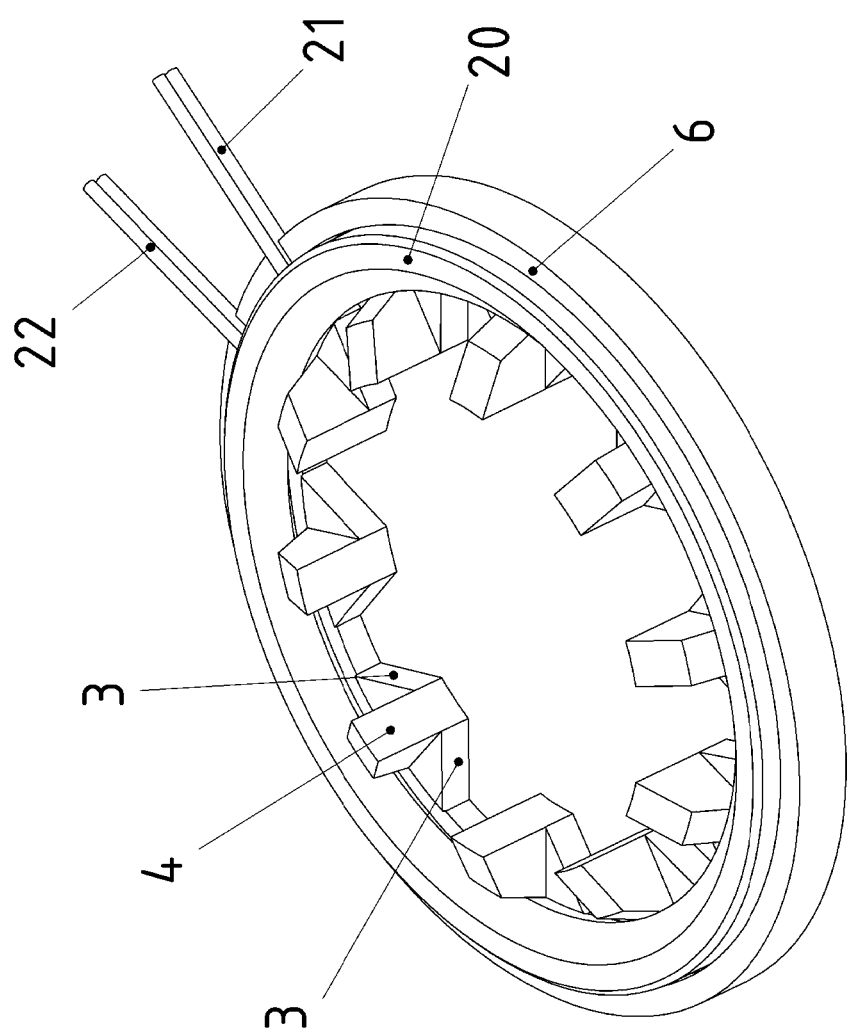
FIG. 2 shows another, substantially identical stator segment 1 of the electric motor according to the present invention, in an oblique view, in which a stator winding 20 in the form of a ring winding is inserted radially between the pole shoes and stator yoke 6.

As illustrated in FIG. 1, stator segment 1 has pole shoes, which are pointing radially inward, i.e., toward the rotor (not shown), and which are evenly spaced apart in the circumferential direction.

The pole shoes are fixated by an annular stator bridge 5, which has a stator yoke 6 that axially projects at its radially outer end region, that is to say, in the direction of the rotor shaft axis.

The radially inwardly pointing area 4 of the pole shoe, i.e., the side of the pole shoe facing toward the air gap between stator and rotor, has a planar or curved design; in a curved design, a circular segment having the radius of the stator inner bore is used.

The active component of the rotor provided on the rotor and facing area 4, for example, may include permanent magnets, which are placed at regular intervals in the circumferential direction, the magnetization direction of permanent magnets situated next to each other in the circumferential direction being aligned in mutual opposition.

Instead of permanent magnets, it is also possible to use appropriately disposed electromagnets including an excitation winding. As a further alternative, it is also possible to use a short-circuit cage or a reluctance rotor as active component.

The active component, especially the permanent magnets or electromagnets including an excitation winding, has essentially similar axial dimensions, or the same width dimensions, as the pole shoes. This makes it possible to obtain a high efficiency factor.

Starting from area 4, the transition region toward stator bridge 5 has a broadened region on the side, which extends in and counter to the circumferential direction. The width of the widened region provided in the circumferential direction becomes greater with increasing radial clearance.

Pole shoe back 42 has a bulbous design, but to simplify the illustration, the bulbous shape in FIGS. 1, 2, 3, 4, 5, 6, 7 is shown in the form of two planar area segments.

Lateral broadening 3 and the bulbous profile of pole shoe back 42 are adapted to one another such that the magnetic field entering at areas 4 is introduced into the stator bridge without any concentration of the field lines in the pole shoe. That is to say, the pole shoe is shaped in such a way that at least essentially no subregion of the pole shoe becomes saturated as long as no saturation occurs in the surface region of area 4.

In other words, as long as the magnetic field intensity at area 4 remains below the value that is critical for the occurrence of saturation, no saturation will occur in the pole shoe either. The pole shoe thus has sufficient material for conducting the field lines. However, the shape of the pole shoe is selected such that as much winding space as possible remains for stator winding 20. In addition, a sufficiently large air gap also remains in relation to the pole shoes of further stator segment 1, which according to FIG. 3 forms a stator phase segment in conjunction with first stator segment 1.

In this context it is also important that area 4 axially extends such that it basically covers the axial region covered by the stator phase segment. This ensures the greatest utilization.

Since the extension of area 4 in the axial direction is greater than the extension in the circumferential direction, the pole shoe deflects the field lines in the direction of the transition to stator bridge 5, to a surface of equal size, but one that has a greater extension in the circumferential direction than in the axial direction. In general terms, the field lines are deflected in the form of a spiral, so to speak. However, in this deflection there is always sufficient material along the path of the field lines to basically prevent the occurrence of saturation at any location in the pole shoe.

That is to say, from radially inside to radially outside, the pole shoe is shaped in such a way that the pole back becomes axially narrower to the extent that the pole shoe widens along the side, i.e., in the circumferential direction. The precise form of the pole shoe is selected to allow an uncomplicated production.

Figure 4:
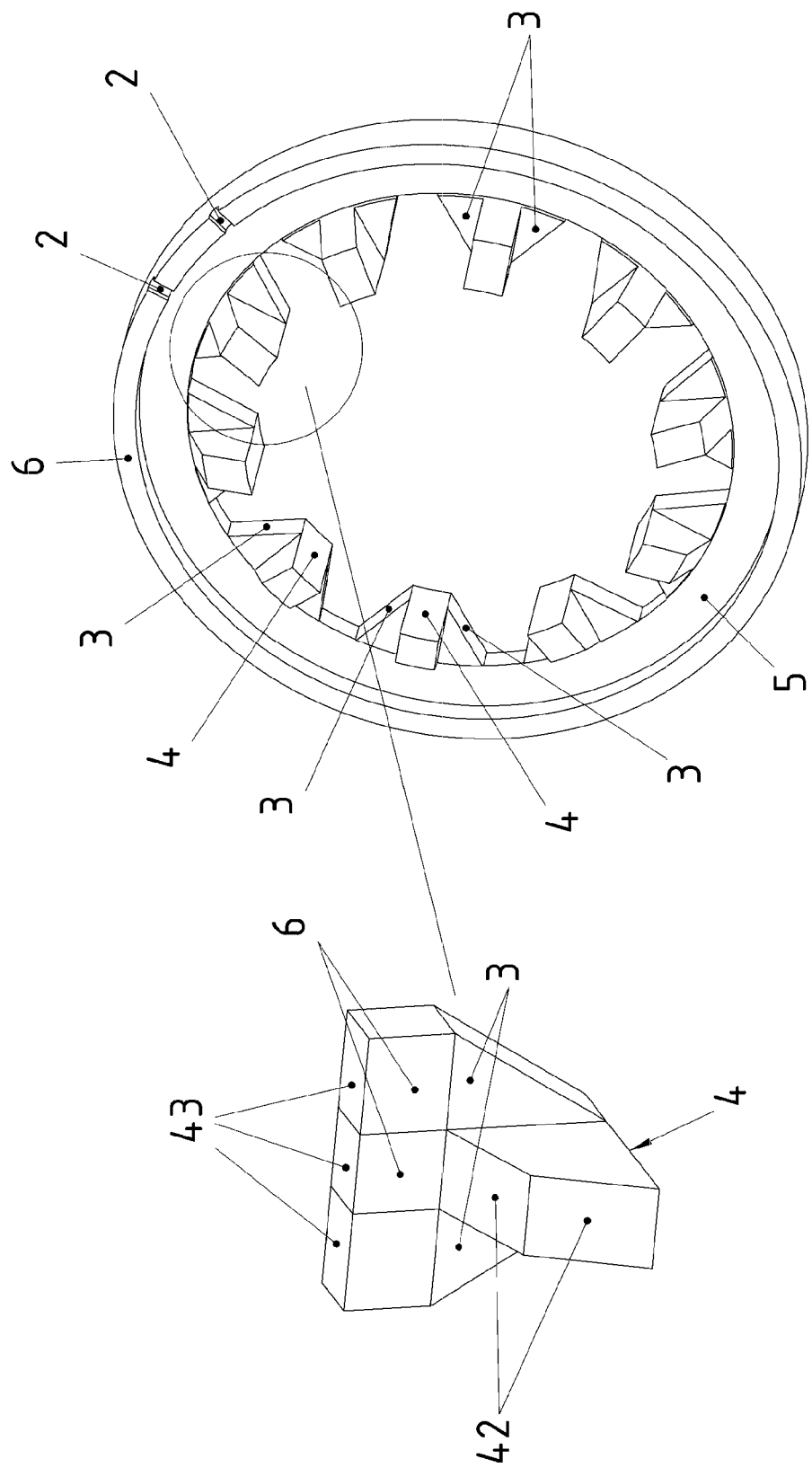
FIG. 4 shows the stator segment according to FIG. 1, which features pole shoes, which are directed radially inward and situated at regular intervals in the circumferential direction, one pole shoe, which is illustrated in a simplified manner, being shown in an enlarged view.

FIG. 4 shows a transition area 42, into which the field lines are rerouted starting from area 4. Although transition area 42 is developed parallel to area 4, it has a greater extension in the circumferential direction than in the axial direction, whereas area 4 has a greater extension in the axial direction than in the circumferential direction.

Stator segment 1 is produced from a magnetizable material, such as pressed or sintered iron powder, especially SMC, and developed in a single piece or composed of multiple pieces.

Figure 3:
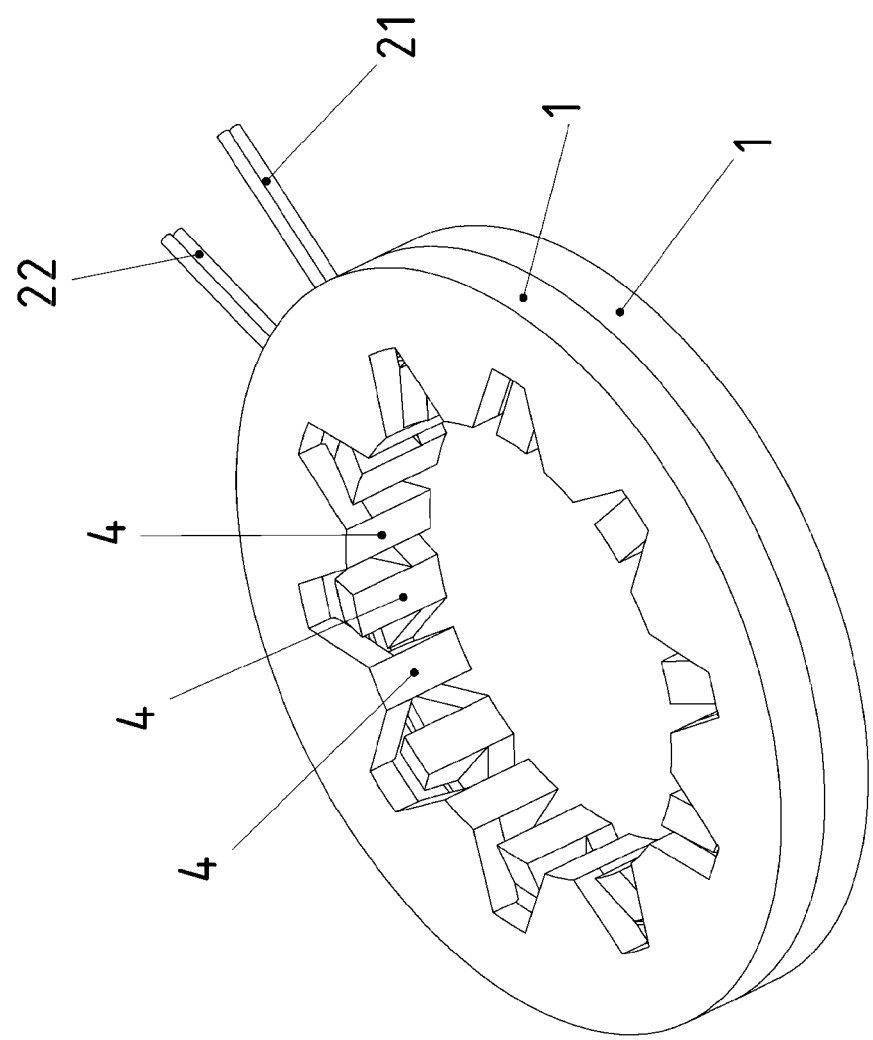
FIG. 3 shows an oblique view of a stator phase segment of the electric motor, the stator phase segment being created by joining stator segments 1 of FIG. 1 and FIG. 2.

As illustrated in FIG. 3, two stator segments 1 of identical shape are joined, and a stator winding 20, developed as ring winding, is inserted in the interspace between stator bridges 5 of the stator segments. Stator yokes 6 of both stator segments 1 face and touch each other, so that the magnetic field is able to cross from a first stator segment 1 to a second stator segment 1 basically without any interference.

Since the two stator segments 1 are rotated relative to each other by one half of the peripheral angle that exists between most proximate two pole shoes in the circumferential direction, of a particular stator segment 1. The pole shoes of the two stator segments 1 consequently alternate in the circumferential direction. In other words, each pole shoe of a first stator segment 1 is followed by a pole shoe of the other stator segment 1 in the circumferential direction.

Each stator segment 1 has two depressions 2, which are set apart from each other in the circumferential direction. Depressions 2 are preferably realized in the form of slots that extend in stator yoke 6 in the radial direction; the slots, in particular, are disposed on the axial end face pointing toward the other stator segment 1 of the phase segment.

Given a suitably selected angle of rotation, the slots of the two stator segments 1 of the phase segment become congruent and then jointly form a recess 51, especially a passage for outgoing line 22 and incoming line 21 of stator winding 20.

Since the two slots 2 are once again set apart from each other by one half of the peripheral angle that exists between two most proximate pole shoes of a particular stator segment 1 in the circumferential direction, the two slots 2 of a first stator segment become congruent with the two slots 2 of the other stator segment 1.

The slots on the stack are visible from radially outside as long as the stack has not been inserted into the housing component yet. As a result, these slots are able to be detected by a production machine equipped with image detection and may be used to adjust the relative angle of rotation between the phase segments of different phases, i.e., between the phase segments energized by different phase currents.

The phase currents, for example, are phase currents of a three-phase AC power system.

Figure 5:
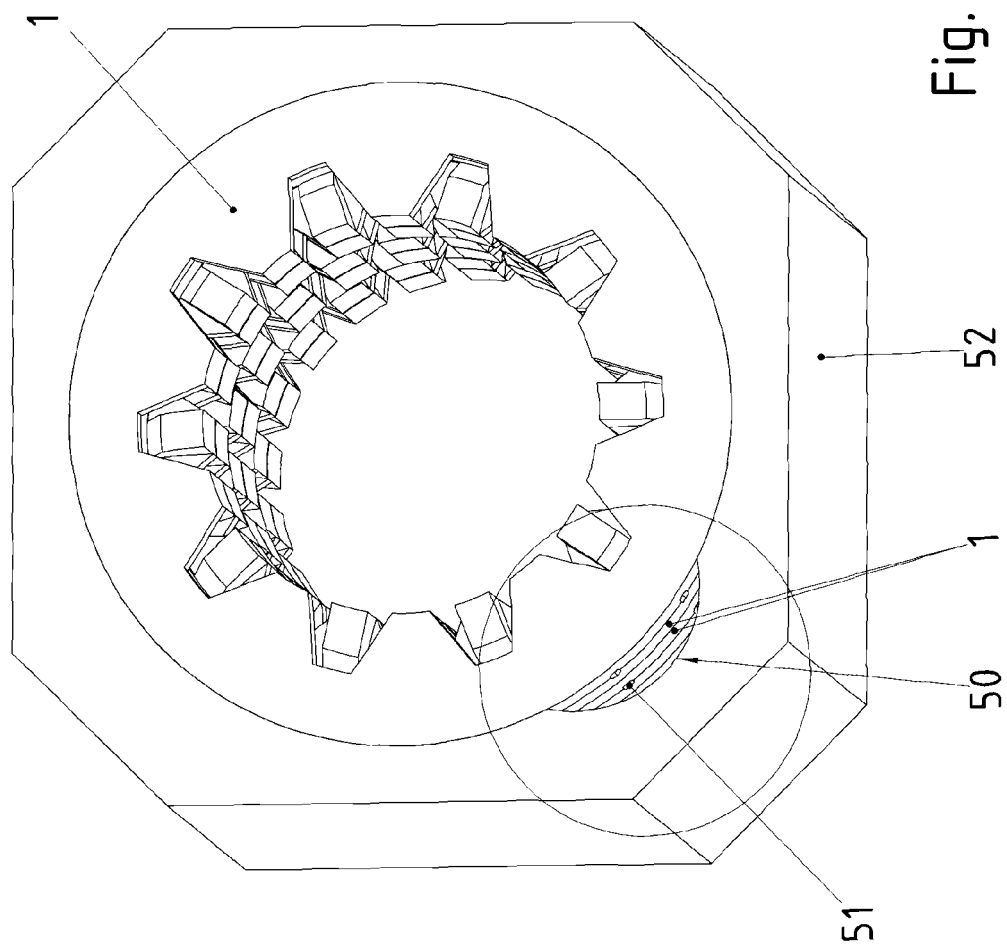
FIG. 5 shows a housing component 52, into which a stack of stator phase segments according to FIG. 3 has been inserted, an axially extending cable channel 50 being situated inside housing component 52.
Figure 6:
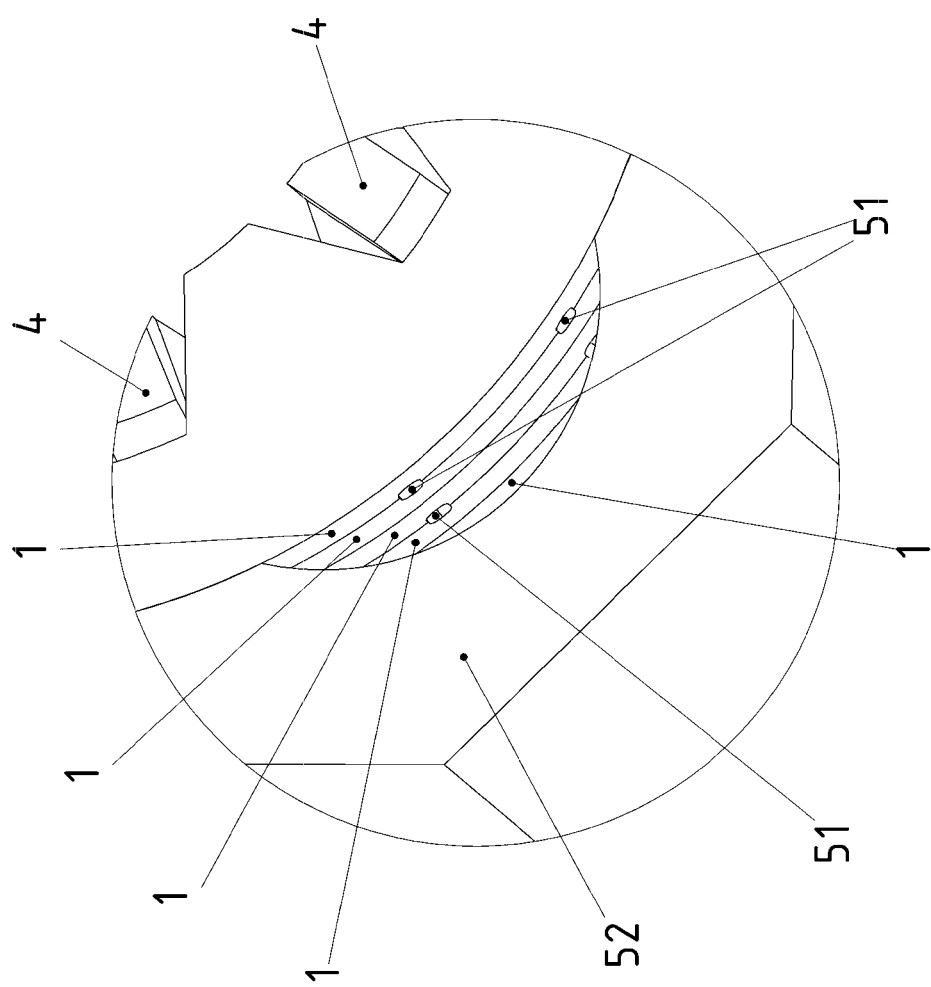
FIG. 6 shows an enlarged detail of FIG. 5.

As shown in FIG. 5, multiple phase segments, identically made up of two stator segments and one stator winding, are stacked one behind the other in the axial direction so as to form the electric machine, the phase segments being rotated relative to each other if energized by different phase currents (U, V, W).

Phase windings that are part of the same phase currents are not rotated, or are rotated to a lesser degree than if they were energized by different phase currents (U, V, W), or they are are rotated only by an integer multiple of the above-mentioned peripheral angle between the pole shoes of an individual stator segment 1. As a further alternative, phase segments that are part of the same phase currents are not rotated relative to each other, or rotated only by the integer multiple of the aforementioned peripheral angle between the pole shoes of a particular stator segment 1.

The phase segments stacked on top of each other in the axial direction are in physical contact, and a thin electrically insulating layer may possibly be introduced between them. This thin electrically insulating layer improves the efficiency of the machine. The stack is accommodated in a recess of a housing component 52 holding the stack, housing component 52 preferably being connected by shrink-fitting or bonding, especially in a force-locking manner. To do so, housing component 52 is brought to a higher temperature prior to the connecting process, especially a temperature that is higher by at least 50 Kelvin or at least 100 Kelvin, than the stack. As a result, it is easy to insert the stack into housing component 52, and a force-locking connection is achieved following the temperature adjustment.

Housing component 52 is preferably made from metal, especially aluminum or steel.

The individual outgoing lines 22 and incoming lines 21 are routed to the outside in axially extending cable channel 50. Cable channel 50 is preferably developed as a groove in the inner wall of the receiving bore for receiving the stack.

Stator segments 1 of each individual phase segment touch only at their axial front ends, in the region of stator yokes 6 that axially project in each other's direction. A minimum air gap is maintained between the two stator segments 1 in the other surface regions. Instead of air, stator winding 20 and/or the molding compound and/or insulating paper are/is provided.

Cut face 70 of FIG. 7 is explained in FIG. 8. FIG. 8 explains the profile of the surface of pole shoe back 42. Different profiles are selectable, depending on the desired production complexity.

The linear, i.e., planar, profile 82 is especially easy to produce, but causes saturation of subregions of the pole shoe already at noncritical field intensities, even if area 4 does not become saturated yet.

In the case of bulbous profile 80, sectioned pole shoe back 42 takes the form of a circle segment.

The profiles of pole shoe backs 42 according to the present invention have a profile that lies between profiles 80 and 82. Pole shoe back 42 according to the present invention therefore has an essentially bulbous design, and the decrease in the pole shoe back with increasing radial clearance is accompanied by an increase in the lateral broadening in the circumferential direction.

Since the edge lying between pole shoe back 42 and area 4 is at risk of edge fracture, a reinforcement according to profile 81 or rounding in this area is advantageous.

The center point of the circle center associated with profile 80 lies at the corner of the equal-sided isoceles triangle associated with profile 82.

Pole shoe back 42 associated with profile 80 is therefore developed in the form of a cylinder wall segment. For FIG. 8 shows only the centrally disposed section.

Pole shoe back 42 associated with profile 82 therefore is developed in the form of a planar surface section. For FIG. 8 shows only the centrally disposed section.

Especially advantageous is the profile of the section of the pole shoe back shown in FIG. 9. Two linear segments, which have an angle between 0° and 90°, especially between 15° and 50°, are joined in profile 92. In the section according to FIG. 9, the length of the two linear sections is identical or it differs by less than 30%.

Since rounded regions reduce the risk of edge fractures, FIG. 9 shows such a profile. It has a first circular segment 90 and a second circular segment 91, and a continuous smooth and differentiable transition is provided between circular segments 90 and 91. The length, i.e., the arc length, of circular segment 90 is between 10% and 50%, especially between 15% and 35%, of the length of circular segment 91.

Pole shoe back 42 has a similarly curved profile, since only the centrally disposed section is shown in FIG. 9.

Insulating paper is situated between the individual stator segment 1 and stator winding 20 to improve the insulating clearance. As an alternative, the winding is extrusion-coated by insulating plastic.

The circular arc segment in profile 90 is concave; the circular arc segment in profile 91 is convex. Profile 92 is implemented in simplified form, i.e., pole back 42 is composed of two planar surfaces.

The electric machine according to the present invention may also be called a claw-pole type transversal flux machine.

In an additional exemplary embodiment according to the present invention, a temperature sensor is situated in the region of stator winding 20, whose terminal leads are likewise routed through passage 51.

LIST OF REFERENCE NUMERALS

1 stator segment
2 depression, especially slot
3 side surface, especially broadening in the circumferential direction
4 pole shoe surface, especially the pole shoe surface on the side of the air gap, i.e., the surface of the pole shoe facing the active component of the rotor
5 stator bridge
6 stator yoke
20 stator winding
21 incoming line
22 outgoing line
42 pole shoe back, especially having a bulbous design
43 transition surface
50 cable channel
51 recess, especially passage
52 housing part
70 cut surface
80 maximally bulbous profile of pole shoe back 42
81 edge reinforcement
82 minimally bulbous profile of pole shoe back 42, especially a linear, planar or straight profile
90 concave profile in the form of a circle segment
91 convex profile in the form of a circle segment
92 simplified profile, composed of two planar surfaces

The invention claimed is:

1. An electric machine, comprising:
   a stator including a stack of stator phase segments, each phase segment including at least one stator segment and at least one stator winding; and
   a plurality of pole shoes, each stator segment including an annular stator bridge on which the pole shoes are premolded, the pole shoes having the same shape; and
   a housing component in which the stack is accommodated, the housing component including an axially extending cable channel, and an axially extending depression on a surface thereof facing the stack, wherein the housing component is connected to the stack one of:
   in a force-locking manner, and
   by being one of thermally shrink-fitted on and bonded to the stack.

2. The electric machine as recited in claim 1, wherein the electric machine is a transversal flux machine.

3. The electric machine as recited in claim 1, wherein the depression faces an inner surface of the stack.

4. The electric machine as recited in claim 1, wherein each stator segment has two radially extending depressions that are set apart from each other by one half of a pole shoe clearance in a circumferential direction.

5. The electric machine as recited in claim 4, wherein the depressions are slots.

6. The electric machine as recited in claim 4, wherein the depressions are located on a side of the stator segment that faces a respective other stator segment of a same phase segment.

7. The electric machine as recited in claim 6, wherein the side of the stator segment is a front end.

8. The electric machine as recited in claim 5, wherein when joining two stator segments to form an individual phase segment, the slots are able to be brought into congruence to form a passage for at least one of an incoming line and an outgoing line of an individual stator winding.

9. The electric machine as recited in claim 1, wherein:
   at least one pole shoe has a width in a circumferential direction that increases with an increasing radial clearance, and
   with increasing radial clearance, the width in the circumferential direction increases to the extent that an axial width decreases.

10. The electric machine as recited in claim 9, wherein the width in the circumferential direction increases in inverse proportion to the extent that the axial width decreases.

11. The electric machine as recited in claim 1, wherein at least one pole shoe has a planar design on a side thereof facing away from another stator segment.

12. The electric machine as recited in claim 11, wherein the at least one pole shoe has the planar design on a side thereof facing away from the other stator segment in order to allow a tightest and contacting design of the stack of the phase segments.

13. The electric machine as recited in claim 9, wherein an associated profile of the axial width as a function of the radial clearance is made up of two segments that are not parallel with each other, each being a linear function of the radial clearance, and wherein a pole back includes two planar surface pieces.

14. The electric machine as recited in claim 13, wherein the two planar surfaces are non-parallel with each other.

15. The electric machine as recited in claim 9, wherein an associated profile of the axial width as a function of the radial clearance includes at least one of a bulbous section and a convex section, the concave section having an arc length that is at least five times shorter than the bulbous section.

16. The electric machine as recited in claim 1, wherein:
at least one of:
an air-gap-side surface of at least one pole shoe has one of an area value of the same magnitude and an area value that differs by maximally 20% in comparison with a transition area toward the stator bridge, and
the pole shoe has a pole back,
the pole back at least one of at least partially faces in a direction of the stator winding and at least partially faces in a direction of another stator segment,
the pole back connects the air-gap-side surface of the pole shoe facing the rotor with the stator bridge, and
the pole back includes a bulbous shape and includes two planar surface pieces that are not parallel with each other.

17. The electric machine as recited in claim 16, wherein the pole back faces a stator bridge surface.

18. The electric machine as recited in claim 1, wherein:
at least one of:
at least one pole shoe is formed in such a way that essentially no subregion of the pole shoe goes into saturation as long as a surface area of an air-gap-side side surface of the pole shoe does not go into saturation yet, and
an axial width of the pole shoe decreases with increasing radial clearance,
an associated profile is disposed between a first and a second profile,
the first profile is a linear function of the radial clearance, a pole back associated with the first profile being a planar area, and
the second profile is a circular function, a pole back associated with the second profile a cylindrical section area.

19. The electric machine as recited in claim 18, wherein the air-gap-side side surface faces the rotor.

20. The electric machine as recited in claim 18, wherein the circular function is a circular segment function.

21. The electric machine as recited in claim 1, wherein:
at least one of:
a pole shoe has a form that is symmetrical with a plane of symmetry, the plane of symmetry running through a center of mass of the pole shoe and being defined by a radial direction starting from the center of mass, and the axial direction, and
the pole shoe has a form that is symmetrical with the plane of symmetry, the plane of symmetry running through the center of mass of the pole shoe, and a direction of a surface normal being a tangential direction at the center of mass.

22. The electric machine as recited in claim 1, wherein an edge of a pole shoe has a broader shape to reduce a risk of an edge fracture.

23. The electric machine as recited in claim 1, wherein:
with increasing radial clearance, an area value of a surface of intersection of a pole shoe with regard to a first area is one of equal to an area value of an air-gap-side side surface of the pole shoe and at least deviates by less than 10% or 20%, wherein one of:
a first surface is a tangential plane and at least one of:
the tangential plane has an individual radial clearance with respect to a rotor shaft axis,
the tangential plane is aligned parallel to the rotor shaft axis,
the tangential plane has the radial clearance,
the tangential plane is aligned perpendicularly to an axis of symmetry, and
the tangential plane has a normal direction that connects the rotor shaft axis to a center of mass of the pole shoe, and
the first area is a cylinder sleeve area that at least one of:
has the individual radial clearance with respect to the rotor shaft axis, and
is aligned parallel to the rotor shaft axis.

24. The electric machine as recited in claim 23, wherein the air-gap-side side surface faces a rotor.

25. The electric machine as recited in claim 1, wherein at least one of:
at least one stator segment is made from one of pressed iron powder and sintered iron powder, and
the stator winding is extrusion-coated by insulating plastic.

26. The electric machine as recited in claim 25, wherein the one of the pressed iron powder and the sintered iron powder includes SMC.

27. A method for producing an electric machine, comprising:
a stator including a stack of stator phase segments, each phase segment including at least one stator segment and at least one stator winding; and
a plurality of pole shoes, each stator segment including an annular stator bridge on which the pole shoes are premolded, the pole shoes having the same shape; and
a housing component in which the stack is accommodated, the housing component including an axially extending cable channel, and an axially extending depression on a surface thereof facing the stack, wherein the housing component is connected to the stack one of:
in a force-locking manner, and
by being one of thermally shrink-fitted on and bonded to the stack, the method comprising:
during production of the stack, a production machine at least one of detects and uses slots of the stator segments to align a relative angle of rotation of the phase segments with respect to one another.

28. The method as recited in claim 27, wherein the alignment performed by the production machine is an adjustment of the relative angle of rotation of the phase segments with respect to one another.

* * * * *

UNITED STATES PATENT AND TRADEMARK OFFICE
CERTIFICATE OF CORRECTION

PATENT NO. : 9,647,498 B2
APPLICATION NO. : 14/374105
DATED : May 9, 2017
INVENTOR(S) : Dreher et al.

Page 1 of 1

It is certified that error appears in the above-identified patent and that said Letters Patent is hereby corrected as shown below:

On the Title Page

Item (12) "Dreher" should read -- Dreher, et al. --.

Item (72) Inventor is corrected to read:
-- Florian Dreher, Bruchsal, (DE);
Nejila Parspour, Gerlingen, (DE) --.

Signed and Sealed this
Fifteenth Day of October, 2019

Andrei Iancu
*Director of the United States Patent and Trademark Office*